July 12, 1932.    M. ABEL    1,867,048
DIRECTORY SYSTEM
Filed Feb. 28, 1931    2 Sheets-Sheet 1
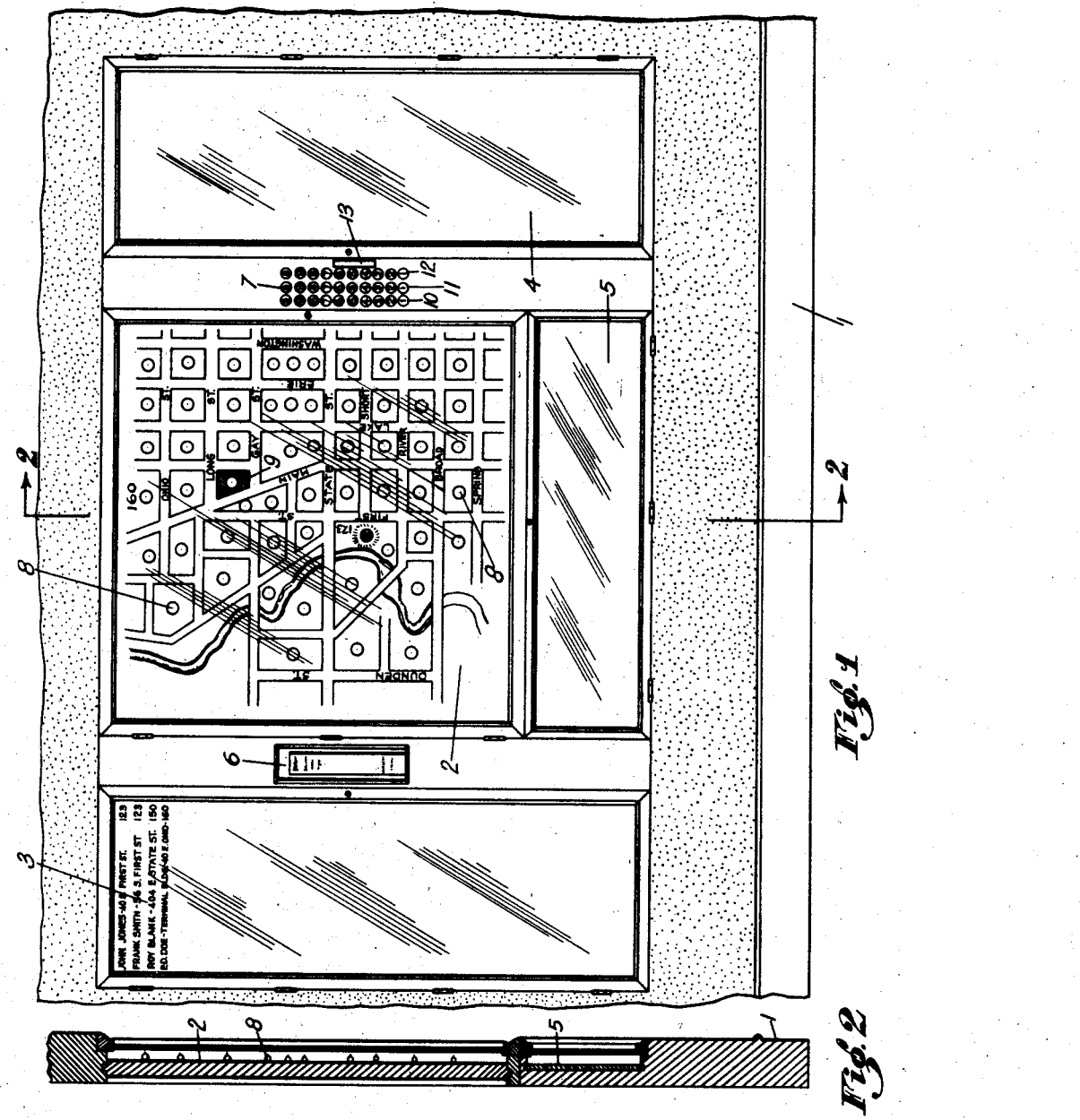
INVENTOR.
Michael Abel.
BY
ATTORNEYS.

Patented July 12, 1932

1,867,048

UNITED STATES PATENT OFFICE

MICHAEL ABEL, OF COLUMBUS, OHIO

DIRECTORY SYSTEM

Application filed February 28, 1931. Serial No. 519,041.

My invention relates to a directory system and has to do, particularly, with a directory comprising a list of names of individuals, firms, business houses, et cetera, in combination with a map, the directory and map to be located at a central place and to be supplemented by a means for visually indicating upon this map the location of any particular individual, firm, et cetetra, with relation to the location of the map and directory.

One of the objects of this invention is to provide a directory system that will be comparatively permanent and will be practically unlimited with respect to the number of names which may be contained in the directory.

Another object of this invention is to provide a means for visually indicating various locations upon the map and maintaining such visual indication for a length of time adequate to permit the operator to have ample time to observe and properly locate the individual, firm, et cetera, in which he is interested.

Another object of this invention is to provide a map structure and indicating means therefor of maximum simplicity and of such a structure to require a minimum number of changes to keep the directory system up to date.

One of the features of my invention consists in the provision of a map which is provided with a number of stations, each one of which is preferably provided with a single indicating signal, as for instance, a lamp. For example, in indicating the blocks of a business section or of a city as a whole, I preferably provide a lamp for each block. In indicating the various departments of a department store, I preferably provide a single indicator, as a lamp for each department. It will be understood that the various blocks of a city or the various departments of a department store are preferably laid out as units upon the map with a visual indicating signal located within each unit. Obviously, my directory is applicable in numerous other situations, as in parks, public buildings, office buildings, exhibitions, and, in fact, may be effectively used in innumerable situations which will readily suggest themselves.

Another feature of my invention arises from the fact that my directory, which may take the form of a list of names disposed in juxtaposition to the map or disposed in a directory book, preferably devotes the same number to every name located in a given block. Thus, there may be fifty or more concerns in a single block and in the directory each of these concerns, in addition to having the name and address thereof, will be given the same number.

In conjunction with this directory, the signal for each block upon my map has a definite number which is preferably clearly displayed and this signal is preferably actuated by depressing one or more keys for selecting the signal to be actuated and by then depressing a single key for effecting actuation of this signal.

Another feature of my invention consists in the provision of a means whereby the signal, upon being actuated, will remain displayed for a pre-selected period of time. Furthermore, the actuating mechanism is such that the signal selected will remain selected, even after its actuation has been discontinued until a new signal is selected. Thus, the actuation of the signal may be repeated several times as long as no new signal has been selected.

Various other features of this invention will appear as this description progresses. The preferred embodiment of the invention is shown in the accompanying drawings wherein similar characters of reference designate corresponding parts and wherein:

Figure 1 is a front elevation of my map structure and associated parts, including the signal actuating means and board directory.

Figure 2 is a section taken on line 2—2 of Figure 1.

Figure 3:
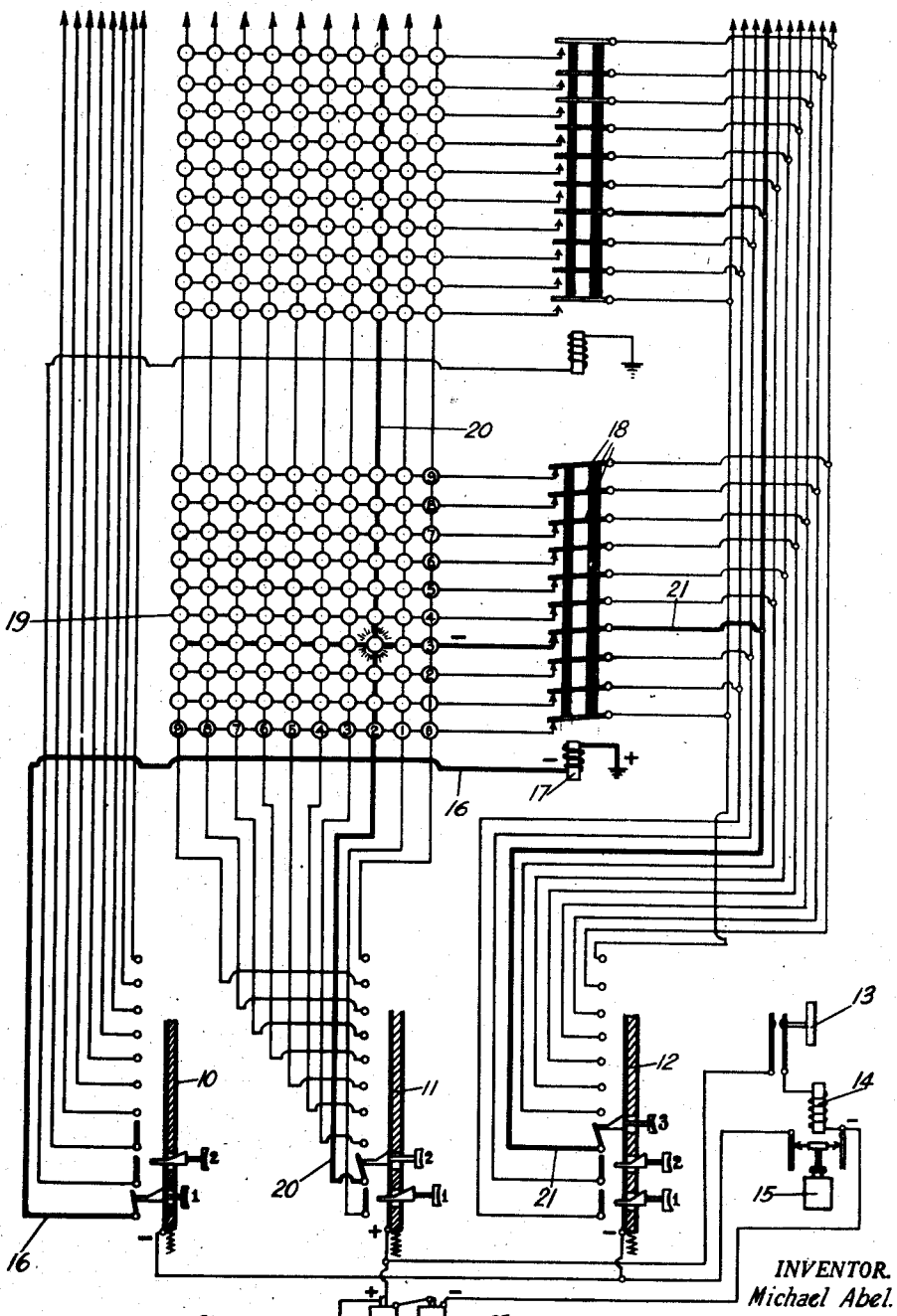
Figure 3 is a diagrammatic representation illustrating a series of lamp signals which I may use in my invention, together with the wiring and the means for selecting and actuating the respective signals.

In the drawings, my map structure is shown as comprising a casing 1 having a centrally disposed map 2 with directory panels 3 and 4 on either side thereof. Immediately beneath the map, I may provide a panel 5 which may be utilized for any special form of advertising or for notices, such as theater notices. The structure is likewise preferably provided with a recess 6 for the reception of a directory book of any desired form. It is also provided with a bank of keys that may be generally designated 7 and whose functions will be fully described hereinafter.

In the form of map which I have shown, a section of a city is diagrammatically indicated and it will be seen that each block of this section is provided with one or more visual signals that may each be designated 8. These visual signals 8 preferably take the form of lamps that may be caused to light by the actuation of two or more keys of the bank 7. Each block or area of the map is provided with a number which may be on a transparent or translucent portion of the map disposed above the respective lamps or may be on the map itself in the area indicated by the respective lamps. Furthermore, if desired, transparent or translucent caps having the numbers thereon may be disposed on the map above the respective lamps.

On the map 2, the location of the map structure itself is indicated by the shaded block 9 and in this block of the map, if desired, there may be a permanently lighted lamp; or the block may be shaded or marked in such a way as to indicate to the operator that this is the block in which he is located while he is operating the directory. In this form of my device, the purpose is to light a lamp in a second block upon the map so that the operator may clearly visualize the location of the address which he is seeking and its relation to his location at the time he is operating the directory.

The means for selecting and lighting the second lamp, that is, the lamp which indicates the location of the block wherein the operator will find the address which he is seeking, is shown diagrammatically in Figure 3. In this figure, the "hundred" row of the bank 7 is indicated at 10. The "tens" row is indicated at 11. The row below ten is indicated at 12. These rows of keys, with ten keys in each row, constitute the means for selecting the lamp to be ignited.

The means for effecting lighting of the lamp, after it has been selected, due to the fact that one of the keys in each of the rows 10, 11 and 12 has been pressed in, takes the form of a starting key which is indicated at 13 and which is supplemented by a relay 14. This relay is what is known as a "slow acting" relay which operates to close contacts and maintain them closed for a selected length of time under the control of a dash pot 15.

The circuits which control the selection and ignition of the lamp may be supplied with energy from any desired source. In Figure 3, I have shown batteries that may be designated 25. Obviously, other sources of current may be used.

Owing to the fact that the electrical equipment which I preferably utilize for selecting and igniting the lamps is of standard form and well known in the electrical art and, particularly, in the visual signal art, I shall not attempt to describe this mechanism in detail or to trace the circuits any more than is necessary to make clear in a general way the manner in which these lamps are selected and ignited.

In the operation of this mechanism for the selection of a light and for the ignition of the same, the operator first turns to the directory. He may be looking for John Jones or he may be looking for Frank Smith, both of whom are, for example, in block 123. If so, he will find that the directory which gives the address of each of these men also has, associated with their names, the number 123.

Having acquired this information from the directory board or book, he presses the "1" key in the "hundred" row. As shown in Figure 3, this results in selecting a circuit through the wires 16 which is indicated in heavy black lines and through the electrical magnet 17 to the ground.

The subsequent energization of this electrical magnet 17 actuates the ten point relay of which this electrical magnet is a part with the result that the series of contacts 18 are closed. This results in preparation for energization of the entire group of contacts which may be designated 19. This group of contacts is thus placed in such condition that the pressing of any key in the "tens" row 11 will select a circuit through the desired row in group 19, or any group thereafter, it being understood that any desired number of groups are provided.

In Figure 3, I have shown sufficient wiring for ten groups of contacts similar to group 19. Each of these groups of contacts is connected with a set of contacts 18. The contacts 18 are adapted to form a ten point relay which may be actuated by means of an electrical magnet 17. A magnet 17 is disposed below each set of the contacts 18, which are, in turn, disposed adjacent each group of contacts, similar to group 19. One of the wires 16 leads to each magnet 17.

After this operation, the "2" key in the "tens" row, that is, row 11, is pressed. The pressing of this "2" key prepares the circuit 20 for energization which is to be effected subsequently by the starting key.

Then, the "3" key in row No. 12 is pressed and this prepares the circuit 21 for subsequent energization by the starting key.

When these steps have been taken, the lamp in block No. 123 has been selected. The pressing of the starting key 13 energizes the electrical magnet 14 to close the slow acting relay. This results in a complete energization of the circuits 16, 20 and 21 and the lighting of the lamp in block No. 123.

The slow acting relay serves to hold the circuit closed and the lamp ignited for a pre-selected period of time, which time period may be readily regulated by regulation of the dash-pot 15. After this interval of time has elapsed, the slow acting relay opens and the light is extinguished. However, the circuits 16, 20 and 21 still remain in preparation for re-energization and the operator need only again press the key 13 to effect such re-energization and again light the lamp in block 123.

As a matter of fact, the keys "1", "2" and "3" will remain pushed in until some other numbers of keys are pressed in their respective rows, which effects their automatic release. However, the starting key always returns to initial position upon release and is, therefore, ready for actuation at any time. Furthermore, it is not necessary to await the expiration of the period of lighting of any lamp before starting a selection of a new number. Likewise, the selection of a new number may only necessitate the pressing of a key in one of the rows of numbers, provided the keys already depressed in the remaining rows complete the number which it is desired to select. For instance, in changing from 123 to 423, the pressing of 4 in column No. 10 releases the 1 in this column and the 2 and 3 which have already been depressed in columns 11 and 12 need not be disturbed.

It will thus be seen that the selection of the proper circuit to indicate the number of block desired is as simple as the operation of an adding machine and that this is also true of the actuation of the starting key which results in the ignition of the lamp which has been selected. It will also be apparent that the operator may ignite the same lamp as often as desired, merely by pressing the starting key, provided the selecting keys have not been disturbed by the actuation of other keys in their respective rows.

It will be understood that the term "map" which is used in the description and claims of this application is intended to include charts, diagrams, floor plans, or any other similar devices which might be suitable for the purposes to which this device is applicable.

It will be understood that my invention is intended to include a device of this type wherein a group of signals may be simultaneously selected and then ignited as, for instance, where the operator may desire to indicate the location of a plurality of garages or other buildings of similar character. This may be readily accomplished by a slight variation in the mechanism for selecting the lights. In such a situation, it might be desirable to provide a single number or signal which is applicable to a group of signals to be selected.

It will be apparent that, in addition to the advantages already indicated, I have provided a directory system in which large numbers of addresses may be selected and indicated with a minimum of effort. Furthermore, the system is such that any change of address does not necessitate a change in the map structure or in the wiring. The block numbers will always remain the same and, consequently, such changes as are necessary need only occur in the directory, with the exception of the replacement of lamps and such parts of the map structure as may become worn or broken. Furthermore, the selection of the number is a very simple operation and the lighting of the lamp in the block selected is equally simple.

Numerous other advantages of my invention will be apparent. Among these are the simple manner of showing the relation between the block in which the operator is located at the time of operation of the directory and the block wherein such operator will find the address which he is seeking. Likewise, these advantages include the actuation of the lamp for a regulable period of time and the fact that this ignition of the lamp may be repeated as often as desired. It has already been pointed out that my invention is capable of wide application and is not limited to the location of addresses in a city.

Having thus described my invention, what I claim is:

1. A directory system comprising a map, a plurality of indicating signals on said map and so disposed as to indicate respectively different locations on said map, a directory for use in cooperation with said map having a symbol applied to each name or group of names, the symbols for all of the names in the location indicated by any signal being identical, a mechanism for operating each of said signals, and means for selecting any one of said mechanisms by the symbol applied to the names in the directory which are in the location indicated by the signal to be selected.

2. A directory system comprising a map, a plurality of indicating signals on said map and so disposed as to indicate respectively different locations on said map, a directory for use in cooperation with said map having a number applied to each name, the numbers for all of the names in the location indicated by any signal being identical, a mechanism for operating each of said signals, and means for selecting any one of said mechanisms by the number applied to those names in the directory which are in the location indicated by the signal.

3. In a directory system, a map, a plurality of indicating signals on said map and so disposed as to indicate respectively different locations on said map, a directory for use in cooperation with said map and having a number applied to each name, the numbers for all of the names in the location indicated by any signal being identical, a mechanism for operating each of said signals, and means for selecting any one of said mechanisms by the number applied to those names in the directory which are in the location indicated by the signal, and means for energizing said signal after it is selected.

4. A directory system comprising a map, said map being divided into several separate areas, an indicating signal in each of said areas, each of said areas being provided with a symbol, and means for selecting and actuating any of said signals by means of the symbol of the area in which such signal is located.

5. A directory system comprising a map, said map being divided into several separate areas, an indicating signal in each of said areas, each of said areas being provided with a symbol, a mechanism for operating each of said signals, means for selecting and actuating any of said mechanisms for operating any of said signals by means of the symbol of the area in which such signal is located, said last-named means being located in such proximity to the map that any signal may be selected and operated while the operator remains substantially directly in front of said map.

6. A directory system comprising a map, a plurality of indicating signals on said map and so disposed as to indicate respectively different locations on said map, a directory for use in cooperation with said map having a number applied to each name, an electrical mechanism for operating each of said signals, means for selecting any one of said mechanisms by the number applied to those names in the directory which are in the location indicated by the signal, and a slow acting relay associated with said mechanism for prolonging the actuation of said signal.

7. A directory system comprising a map, a plurality of indicating signals on said map and so disposed as to indicate respectively different locations on said map, a directory for use in cooperation with said map having a number applied to each name, an electrical mechanism for operating each of said signals, means for selecting any one of said mechanisms by the number applied to those names in the directory which are in the location indicated by the signal, and an adjustable slow acting relay associated with said mechanism for prolonging the actuation of said signal.

8. In a directory system, a map divided into areas in each of which several concerns are located, an indicating signal in each of said areas, a symbol for each area of the map applicable to all concerns located in that particular area, and means for selecting and actuating any of said signals by means of the symbol of the area in which such signal is located.

9. In a directory system, a map divided into areas in each of which several concerns are located, an indicating signal in each of said areas, a symbol for each area of the map applicable to all concerns located in that particular area, and means for selecting and actuating any of said signals by means of the symbol of the area in which such signal is located, said last-named means comprising a comparatively small number of keys which may be used in different combinations to select different electrical circuits for actuating different signals.

10. In a directory system, a map divided into areas in each of which several concerns are located, an indicating signal in each of said areas, a symbol for each area of the map applicable to all concerns located in that particular area, and means for selecting and actuating any of said signals by means of the symbol of the area in which said signal is located, said last-named means comprising a bank of keys located in such proximity to the map that any signal may be selected and operated while the operator remains standing substantially directly in front of said map.

11. A directory system comprising a map, a plurality of indicating signals on said map and so disposed as to indicate respectively, different locations on said map, a directory for use in cooperation with said map having a symbol applied to each name or group of names, a mechanism for operating each of said signals, and means for selecting any of said mechanisms by means of the symbol applied to the name or group of names in the directory which are in the location indicated by the signal to be actuated, said means comprising a limited number of circuit selectors capable of actuation in different combinations to actuate a comparatively unlimited number of signals.

In testimony whereof I hereby affix my signature.

MICHAEL ABEL.